(12) United States Patent
Kangas et al.

(10) Patent No.: US 8,938,254 B2
(45) Date of Patent: Jan. 20, 2015

(54) METHODS AND ARRANGEMENTS IN A TELECOMMUNICATION SYSTEM

(75) Inventors: Ari Kangas, Lindingö (SE); Iana Siomina, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 898 days.

(21) Appl. No.: 13/131,378

(22) PCT Filed: Jun. 17, 2009

(86) PCT No.: PCT/SE2009/050755
§ 371 (c)(1),
(2), (4) Date: May 26, 2011

(87) PCT Pub. No.: WO2010/064970
PCT Pub. Date: Jun. 10, 2010

(65) Prior Publication Data
US 2011/0230208 A1 Sep. 22, 2011

Related U.S. Application Data

(60) Provisional application No. 61/120,203, filed on Dec. 5, 2008.

(51) Int. Cl.
*H04W 4/00* (2009.01)
*G01S 5/02* (2010.01)

(52) U.S. Cl.
CPC .................................... *G01S 5/0226* (2013.01)
USPC ..................................... 455/456.1; 455/456.5

(58) Field of Classification Search
USPC ......... 455/456.1, 456.5, 456.6; 370/252, 328, 370/331
See application file for complete search history.

(56) References Cited

U.S. PATENT DOCUMENTS 6,160,837 A 12/2000 Bruno et al.
2001/0034238 A1 10/2001 Voyer

OTHER PUBLICATIONS

PCT Search Report, mailed Oct. 20, 2009, in connection with International Application No. PCT/SE2009/050755.
PCT Written Opinion, mailed Oct. 20, 2009, in connection with International Application No. PCT/SE2009/050755.
International Preliminary Report on Patentability, completed Mar. 4, 2011, in connection with International Application No. PCT/SE2009/050755.

*Primary Examiner* — Sam Bhattacharya
(74) *Attorney, Agent, or Firm* — Patent Portfolio Builders PLLC (57) ABSTRACT

There is provided a method in a cellular telecommunications network, the cellular telecommunications network comprising at least a first cell and a second cell. The method comprises the steps of transmitting (302) first periodic physical signals, usable by a device to determine its location, to the first cell; and transmitting (304) second periodic physical signals, usable by a device to determine its location, to the second cell. The second periodic physical signals are synchronized with the first periodic physical signals and have a timing offset, such that the first periodic physical signals and the second periodic physical signals are not transmitted simultaneously. The method is characterized in that transmission of data or control signals to the first cell is inhibited when the second periodic physical signals are transmitted to the second cell.

17 Claims, 9 Drawing Sheets

METHODS AND ARRANGEMENTS IN A TELECOMMUNICATION SYSTEM

FIELD OF THE INVENTION

The present invention relates to methods and arrangements in a telecommunication system, and in particular to a method and corresponding apparatus allowing detection in a device of signals from cells that may not be the serving cell of the device.

BACKGROUND

The possibility of determining the position of a mobile device in a wireless telecommunication network has enabled application developers and wireless network operators to provide location based, and location aware, services. Examples of those include guiding systems, shopping assistance, friend finder, presence services, community and communication services and other information services giving the mobile user information about their surroundings.

In addition to these commercial services, the governments of several countries have put requirements on network operators to be able to determine the position of an emergency call. For instance, the governmental requirements in the USA (FCC E911) state that it must be possible to determine the position of a certain percentage of all emergency calls. The requirements make no distinction between indoor and outdoor environments.

In outdoor environments, the position estimation can be done using positioning systems, e.g. GPS (Global Positioning System) based methods like Assisted-GPS (A-GPS). Position estimation can also be performed using the wireless network itself. Methods using the wireless network can be arranged into two main groups: those using measurements from a single radio base station, and those using measurements from a plurality of radio base stations.

Figure 1:
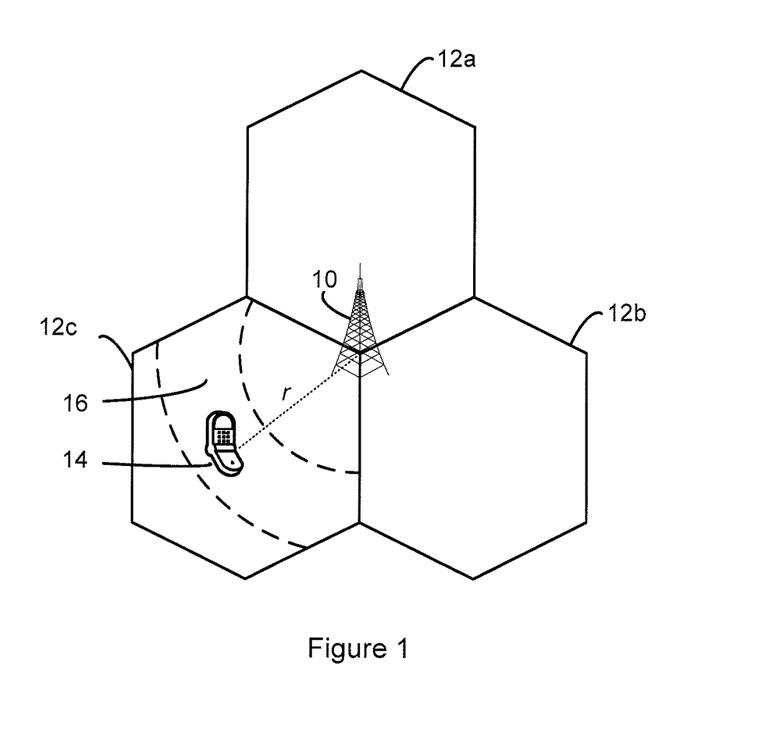
FIG. 1 illustrates a method of determining the position of a terminal in a telecommunications network.

The first group comprises methods that are based on the radio cell to which a mobile terminal is attached, e.g. by using Cell-ID or a combination of cell-ID and Timing Advance (TA). The TA measurement principle is depicted in FIG. 1.

A radio base station 10 serves three radio cells 12a, 12b, 12c. Although three cells are depicted in this example, in general each radio base station will serve one or more radio cells. In order to determine the location of a mobile terminal 14, the travel time of radio waves from the radio base station 10 to the mobile terminal 14 and back is measured. The distance r from radio base station 10 to mobile terminal 14 then follows from the formula:

$$r = c \frac{TA}{2}$$

where TA is the round trip time and where c is the speed of light.

The round trip time measurement alone defines a circle, or if the inaccuracy is accounted for, a circular strip around the radio base station 10 (more accurately, a sphere, or spherical shell) is defined. By combining this information with the cell polygon, angular extent of a part-circular strip 16 that defines the possible position of the mobile terminal 14 can be computed.

In several systems, therefore, among those Release 8 of the 3GPP specifications (also known as long term evolution, or LTE), the round trip time TA can be used to identify the distance from the antenna at which a mobile terminal is positioned. However, it is not possible using this method to ascertain where exactly in the sphere or sector the UE is. If TA measurements determine that the mobile terminal is for example 500 m from the radio base station, this is along an arc in a sector or circumference of a circle.

To overcome this problem, a second group of methods uses round trip time measurements from a plurality of radio base stations. By determining its distance from a plurality of radio base stations, a mobile terminal can more accurately triangulate its position.

However, modern telecommunications systems are designed to provide high data rates in the downlink and the uplink (i.e. in communications to and from the mobile terminal). It is also desirable to reduce power usage in the mobile terminal, in order to prolong the battery life as much as possible. Both of these requirements mandate a high quality radio link between the mobile terminal and its serving radio base station (i.e. the radio base station associated with the mobile terminal's serving radio cell). Thus, interference from other neighbouring radio base stations should be kept to a minimum, and in modern telecommunication systems this is very successfully achieved. A mobile terminal wishing to determine its location, however, has difficulty in detecting signals from neighbouring radio base stations for this very reason.

What is required, therefore, is a method whereby a mobile terminal can detect signals from radio base stations other than its serving radio base station, for example, in order to determine its location.

SUMMARY

According to the present invention there is provided a method in a cellular telecommunications network, the cellular telecommunications network comprising at least a first cell and a second cell. The method comprises the steps of transmitting first periodic physical signals, usable by a device to determine its location, to the first cell; and transmitting second periodic physical signals, usable by a device to determine its location, to the second cell. The second periodic physical signals are synchronized with the first periodic physical signals and have a timing offset, such that the first periodic physical signals and the second periodic physical signals are not transmitted simultaneously. The method is characterized in that transmission of data or control signals to the first cell is inhibited when the second periodic physical signals are transmitted to the second cell.

The method may be performed by a single radio base station transmitting to the first and second cells, or by a first radio base station transmitting to the first cell and by a second base station transmitting to the second cell.

Transmission of data or control signals to the first cell may be inhibited by defining a set of resource elements in which periodic physical signals are transmitted and in which other data or control signals are not. Sets of resource elements may be defined for each such cell, with the sets of resource elements being substantially simultaneous, so that when periodic physical signals are transmitted to, for example, the first cell no other cell in the vicinity of the first cell is transmitting.

In this way, a mobile terminal in the first or second cell can more easily detect the periodic physical signals from each cell even if, for example, the first cell is its serving cell (or another strongly interfering cell). The mobile terminal can then take timing measurements on the periodic physical signals and so determine its location.

A cellular telecommunication system and a radio base station for performing the above method are also provided.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Figure 2:
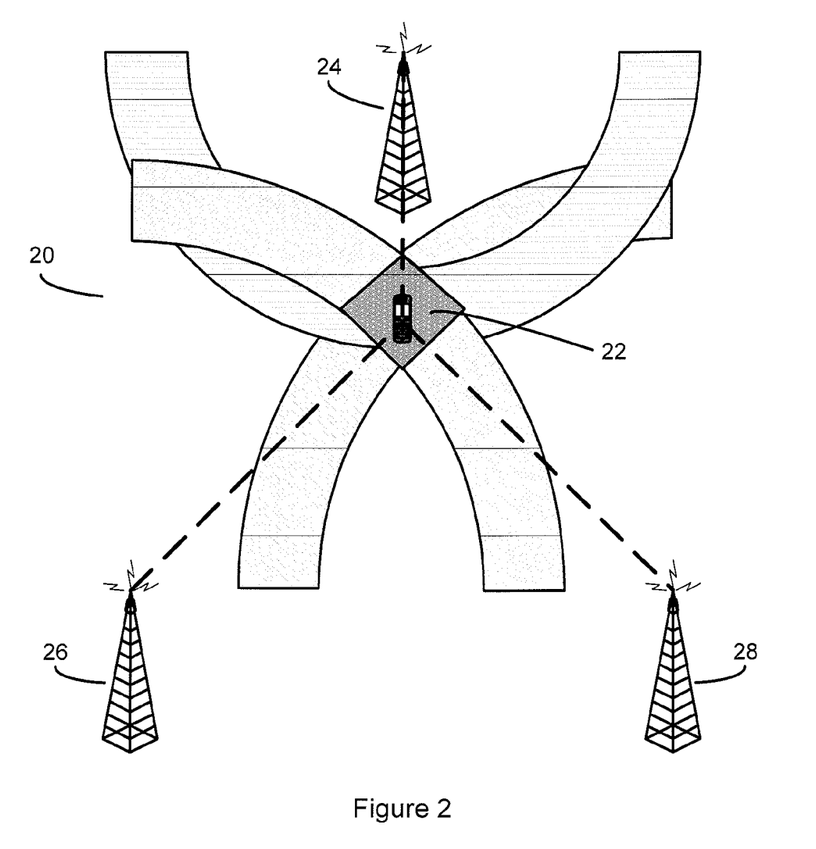
FIG. 2 illustrates a method of determining the position of a terminal in a telecommunications network according to embodiments of the present invention.

FIG. 2 shows a telecommunication system 20.

The telecommunication system 20 may be, for example, an evolved universal terrestrial radio access network (E-UTRAN) for use with Release 8 or any later release of the 3GPP specifications, or any other wireless telecommunication network such as CDMA2000, GSM, WLAN, etc.

The system 20 comprises a terminal 22, which in the illustrated example is a mobile terminal, also called a user equipment or mobile station. The invention is also applicable to stationary terminals.

The system 20 further comprises a plurality of radio base stations 24, 26, 28, of which three are shown here. One of the radio base stations, referenced 24, is the serving radio base station, which maintains the particular radio cell with which the terminal 22 is registered, as will be appreciated by those skilled in the art. Moreover, each radio base station 24, 26, 28 may maintain more than one radio cell. In operation, therefore, the terminal 22 primarily sends transmissions to (uplink), and receives transmissions from (downlink), the serving cell, which is maintained by the serving radio base station 24.

The terminal 22 may also be able to detect signals from neighbouring radio base stations 26, 28 or signals from cells that are not the serving cell; however, these signals will in general be much weaker than those from the serving radio base station 24.

As previously mentioned, at certain instances it is useful to determine the geographical location of the terminal 22. This may be instigated by the terminal 22 itself, or by the network, for example if the terminal 22 is making an emergency call. In the latter case, the terminal 22 receives an instruction from the serving radio base station 24 to determine its location.

When determining its location, in one embodiment the terminal 22 takes time of arrival (TOA) measurements from each of the radio base stations 24, 26, 28 in its vicinity. The measurements allow the terminal 22 to determines a measure of the distance (in practice, a pseudo-distance) from each radio base station, in effect generating circles (or circular strips, taking into account inaccuracy in the measurements) whose radii is equal to the distance, or pseudo-distance, of the terminal 22 from each respective radio base station. The use of "pseudo-distance" arises because of the receiver clock bias in the terminal 22 (see equations (1a) to (1n) below). In such an embodiment, the absolute distance from each radio base station is not measured. The terminal 22 can then determine its location as being at the intersection of these circles.

The TOA principle can be written in mathematical form as follows.

$$t_R^1 = t_T^1 + \sqrt{(x-x_1)^2 + (y-y_1)^2}\Big/c + b + v^1 \quad (1a)$$

$$t_R^2 = t_T^2 + \sqrt{(x-x_2)^2 + (y-y_2)^2}\Big/c + b + v^2 \quad (1b)$$

$$\cdots$$

$$t_R^N = t_T^N + \sqrt{(x-x_N)^2 + (y-y_N)^2}\Big/c + b + v^N \quad (1n)$$

where:
$t_R^i$: Time of reception by the terminal for the ith base station (measured)
$t_T^i$: Time of transmission from the ith base station
$x_i, y_i$: Coordinates of ith base station
c: Speed of light
x, y: Coordinates of MS computed by solving equations (at MS or in network node)
b: receiver clock bias
$v^i$: Measurement error of ith timing measurement $t_T^i$ may be provided to the terminal 22 in a number of ways. For example, $t_T^i$ may be provided with assistance data, or known to the terminal 22 in a synchronized network. The coordinates of the ith base station, $x_i$ and $y_i$, are known in the network, and may be transmitted to the terminal 22, or the terminal 22 could maintain a local database of base station coordinates.

The equations (1a) to (1n) can be solved for the unknowns (x, y, b) whenever n≥3 and the geometry of the base stations is good, i.e. spaced such that the terminal 22 has to look in a different direction for each base station. One method of solving the equations is to use numerical optimization solutions based on Taylor series expansions of equations (1a) to (1n), although alternative methods are well known in the art.

The equations (1a) to (1n) may be solved in the terminal 22 itself, or remotely in the network, in which case the terminal 22 transmits the timing measurements to the network via the serving base station 24.

In addition to the TOA-based method described above, alternative methods of positioning will be known to those skilled in the art. For example, time difference of arrival (TDOA) methods measure the difference in arrival times at different base stations of a pulse signal transmitted by the terminal 22.

Positioning using a timing-based method therefore requires that the timing of at least three geographically dispersed radio base stations is measured. It is necessary to ensure that the signal-to-noise ratio (SNR) to the third strongest base station is strong enough so that it can still be detected by the terminal 22. Cellular systems which reuse the same frequency band are designed to create strong isolation between cells, meaning that the signal from the own serving cell should be strong while interference from the neighbouring base stations should be minimized. This means that the requirements for positioning and communication are conflicting. Since modern telecommunication systems are primarily for communication, time measurements for positioning need to be done at very low C/I (carrier to interference ratio) to neighbouring base stations, which puts high requirements on the terminal receiver and also typically degrades the positioning accuracy. For example, in a setup that minimizes inter-cell interference the C/I to the third base station may be very low, −23 dB at the 5% level for the third strongest base station.

In other circumstances, transmissions from a neighbouring cell may be strongest and prevent the terminal 22 from detecting signals from a third base station, or even from the serving radio base station 24.

According to embodiments of the present invention, this problem is overcome by offsetting the transmission of periodic physical signals in cells that may interfere with one another. For example, a single radio base station may transmit periodic physical signals to multiple cells, where the periodic physical signals for each cell are offset in time with respect to each other. Alternatively, in a synchronized system, the offset transmissions to the cells may come from different radio base stations.

Further, when periodic physical signals are being transmitted in a first cell but not in a second cell, other transmissions are inhibited in the second cell. In this way, interference between cells is minimized, so that the terminal 22 can more easily detect physical signals from neighbouring cells as well as its serving cell. This makes it easier, for example, to take the necessary measurements to determine its location.

Figure 3:
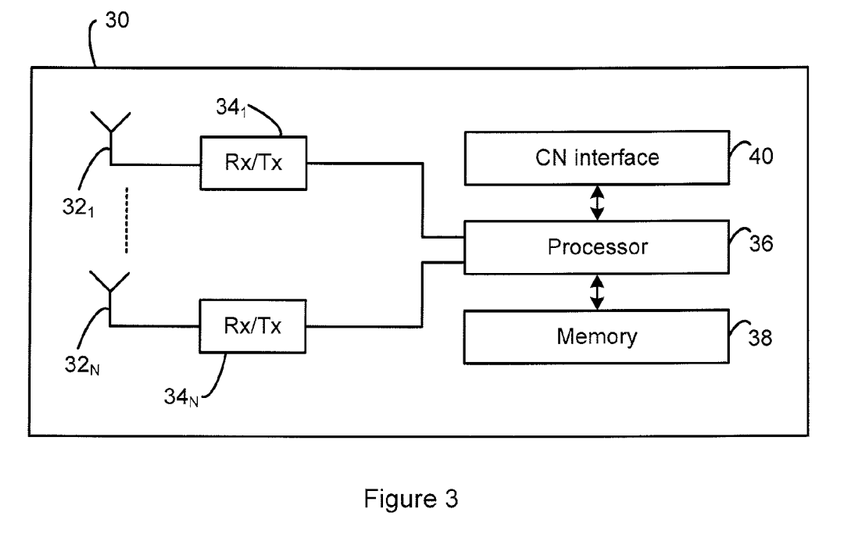
FIG. 3 illustrates a radio base station according to embodiments of the present invention.

FIG. 3 illustrates a radio base station 30 according to embodiments of the present invention. It will be apparent to those skilled in the art that the radio base station is suitable for use in any cellular telecommunication network, under any current or future standard. Therefore, the radio base station 30 may also be termed a NodeB, or an eNodeB, for example.

The radio base station 30 comprises a plurality of antennas, $32_1$ to $32_N$ (where N is an integer greater than one), with at least one of the plurality of antennas 32 responsible for transmitting signals to and receiving signals from each of the cells the radio base station 30 is designed to serve. It will be apparent to those skilled in the art that more than one antenna 32 may be used for each cell, resulting in so-called multiple-input, multiple-output (MIMO) communications.

Each antenna 32 is coupled to Rx/Tx circuitry, $34_1$ to $34_N$, which filters, downconverts to the baseband, and samples signals received by the antennas 32, or the inverse operations for signals to be transmitted by the antennas 32. It will be apparent to those skilled in the art that, although the illustrated embodiment depicts individual Rx/Tx circuitry 34 for each antenna 32, one or more Rx/Tx circuitry 34 may be coupled to all of the antennas 32.

Each Rx/Tx circuitry 34 is coupled to processing circuitry 36, which generates and modulates signals to be transmitted by the antennas 32, or demodulates and interprets signals received by the antennas 32.

As will be familiar to those skilled in the art, the processing circuitry 36 is further coupled to a memory 38, and an interface 40 to a core network (CN) of the telecommunication system. Numerous other features usually found in radio base stations have been omitted for clarity.

Figure 4:
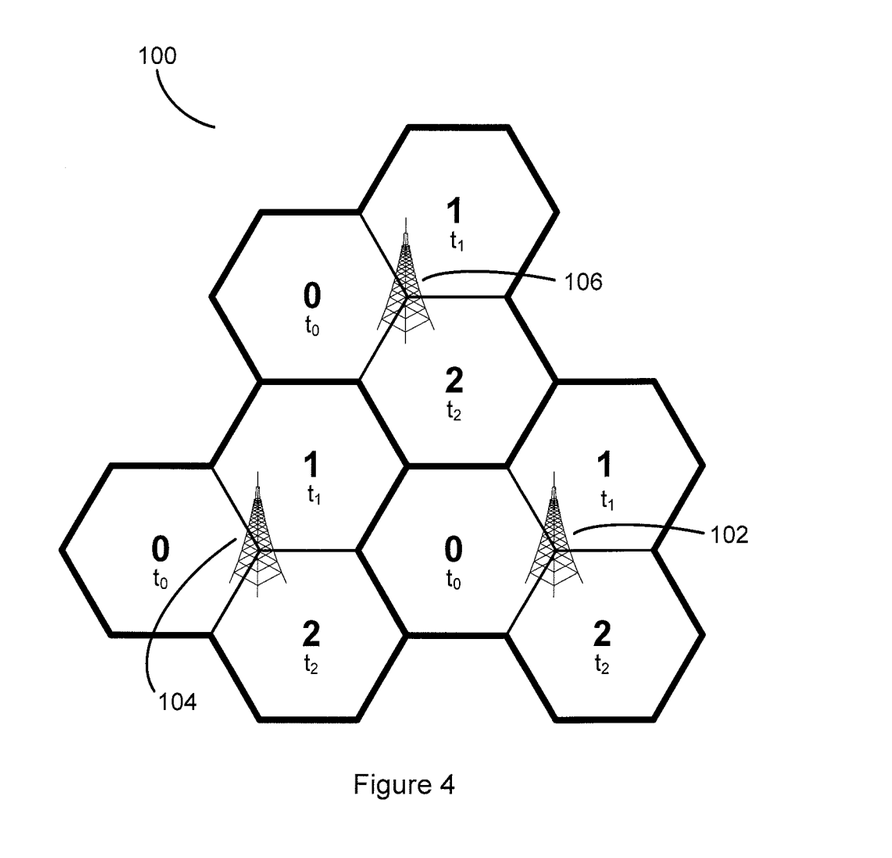
FIG. 4 illustrates a telecommunication system according to an embodiment of the present invention.

FIG. 4 shows a telecommunication system 100 according to one embodiment of the present invention.

The telecommunication system 100 comprises three radio base stations 102, 104, 106, and each radio base station 102, 104, 106 transmits to three cells. However, it will be apparent to those skilled in the art that this embodiment of the present invention contemplates a telecommunication system 100 having two or more radio base stations, and each radio base station may transmit to two or more cells.

In order to allow terminals within the cells to maintain a connection with a respective radio base station 102, 104, 106, each radio base station transmits periodic physical signals to each of its cells. Moreover, as previously stated, the transmissions of the radio base stations 102, 104, 106 are generally synchronized. These physical signals may comprise one or more of reference signals, synchronization signals, or dedicated positioning reference signals. Reference signals are generally transmitted in every subframe; synchronization signals are transmitted in every fifth subframe.

According to this embodiment of the present invention, the telecommunication system 100 is synchronized in that each of the radio base stations 102, 104, 106 transmits periodic physical signals having substantially the same time base (i.e. with the same period). However, the radio base station 102 transmits periodic physical signals to each of its cells with a different timing offset. For example, in the illustrated embodiment, where the radio base station 102 transmits to three cells, the radio base station transmits periodic physical signals to a first cell at time $t_0$, to a second cell at time $t_1$, and to a third cell at time $t_2$. In this way, a terminal in the vicinity of radio base station 102 can more easily detect the periodic physical signals from each different cell, as they are transmitted at different times.

In the illustrated embodiment, each of the three radio base stations 102, 104, 106 transmits periodic physical signals to each of their respective cells using the same timing scheme. Thus, the radio base station 104 transmits periodic physical signals to its first cell at time $t_0$, to its second cell at time $t_1$, and to its third cell at time $t_2$; and the radio base station 106 transmits periodic physical signals to its first cell at time $t_0$, to its second cell at time $t_1$, and to its third cell at time $t_2$. With a suitable network geometry, therefore, a terminal in between each of the three radio base stations 102, 104, 106 will be closest to a cell of each of the radio base stations having a different timing offset. Again, in this way, the terminal can more easily detect the periodic physical signals from each different radio base station, as they are transmitted at different times, and so use those signals to determine its location in accordance with the method shown in FIG. 2.

In order to further mitigate interference between the cells of different radio base stations, the signals transmitted by one radio base station may be transmitted on a different frequency or set of frequencies, or with a different scrambling code to those transmitted by other radio base stations.

Further, according to embodiments of the invention, the transmission of signals to other cells when periodic physical signals are being transmitted to a first cell is inhibited. For example, when radio base station 102 transmits periodic physical signals to its first cell at time $t_0$, transmission of data or physical signals to its second and third cells is inhibited; likewise, when radio base station 102 transmits periodic physical signals to its second cell at time $t_1$, transmission of data or physical signals to its first and third cells is inhibited; and when radio base station 102 transmits periodic physical signals to its third cell at time $t_2$, transmission of data or control signals to its first and second cells is inhibited. The scheme may similarly be applied to the other radio base stations 104, 106.

Figure 5:
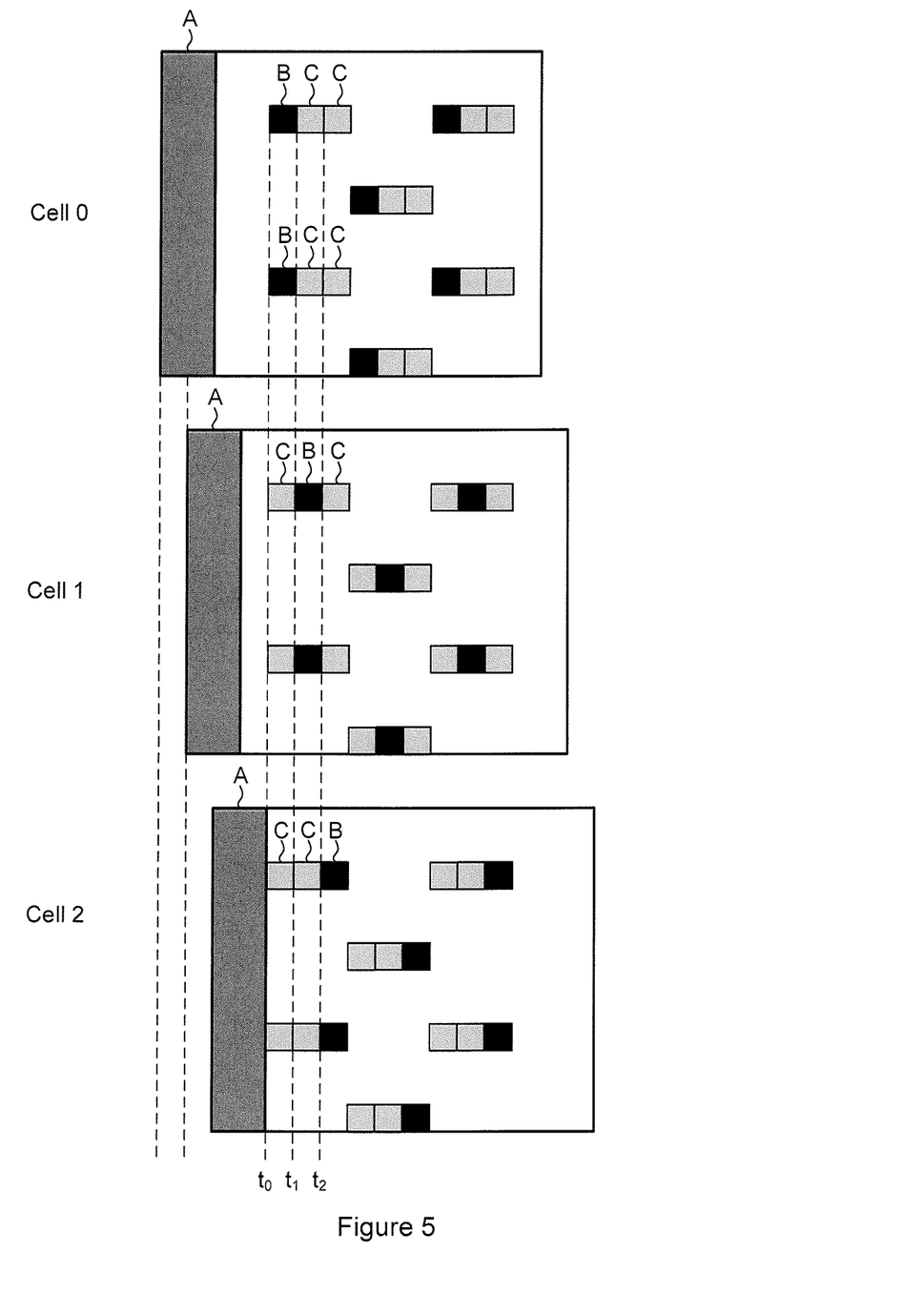
FIG. 5 illustrates a signalling arrangement for a radio base station of the system of FIG. 4.

FIG. 5 illustrates an exemplary signalling arrangement for the radio base station 102, where time, t, is represented by the horizontal axis, and frequency, f, is represented by the vertical axis. Each highlighted block represents one resource element on which the radio base station may transmit, and one subframe is shown for each of the three cells served by the radio base station 102.

It will be noted that each of the subframes is offset by the time taken to transmit using one resource element, also referred to herein as a timeslot. However, different offsets are contemplated by the present invention. Generally, as noted above, the radio base station 102 transmits periodic physical signals to cell 0 at time $t_0$, to cell 1 at time $t_1$, and to cell 2 at time $t_2$.

The transmissions to each cell generally take the same format in this embodiment, with the first two OFDM symbols (i.e. slots in time) reserved for control signals A (medium grey squares). After a further two OFDM symbols, periodic physical signals are transmitted to each cell on two different frequencies B (black squares). This is repeated three OFDM symbols later, using a different pair of frequencies, and repeated again using the original pair of frequencies three OFDM symbols after that. Because the subframes for each cell are offset in time with respect to each other, the periodic physical signals are not transmitted at the same time.

Additionally, the signalling scheme includes resource elements C on which transmission is inhibited (light grey). These are resource elements which correspond in time and frequency to the resource elements on which periodic physical signals are being transmitted to other cells. Thus, there are defined sets of consecutive resource elements (i.e. resource elements that are consecutive in the time domain) in which transmission of periodic physical signals occurs, and in which other transmissions are inhibited. In the first set, for cell 0, periodic physical signals are transmitted in the first resource element of the set; in the second set, for cell 1, periodic physical signals are transmitted in the second resource element of the set; and in the third set, for cell 2, periodic physical signals are transmitted in the third resource element of the set. Each set of resource elements occurs at substantially the same time across each of the cells, because cells either transmit periodic physical signals or are inhibited from doing so during the time covered by the sets of consecutive resource elements. This allows terminals to detect the periodic physical signals from each respective cell more easily.

In the illustrated embodiment, inhibition of other transmissions occurs only in a defined subset of the resource elements in the subframe. However, in some embodiments inhibition of other transmissions occurs in all of the resource elements in the subframe. It will be apparent to those skilled in the art that not all subframes will have periodic physical signals transmitted within them.

As will be appreciated by those skilled in the art, radio base stations 104, 106 may also transmit periodic physical signals to their respective cells using the signalling arrangement described above. Therefore, a terminal in one of the central cells of the system described with respect to FIG. 4 (i.e. cell 0 of radio base station 102, cell 1 of radio base station 104, and cell 2 of radio base station 106), can more easily detect periodic physical signals from each radio base station 102, 104, 106, and so may determine its location.

Figure 6:
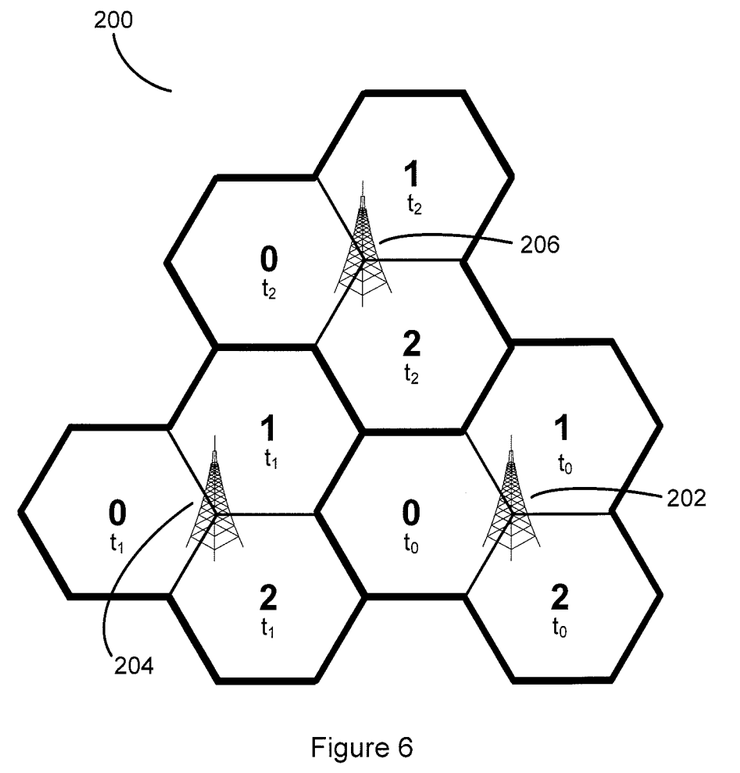
FIG. 6 illustrates a telecommunication system according to another embodiment of the present invention.

FIG. 6 shows a telecommunication system 200 according to another embodiment of the present invention.

Again, the telecommunication system 200 comprises three radio base stations 202, 204, 206, and each radio base station 202, 204, 206 transmits to three cells. However, it will be apparent to those skilled in the art that embodiments of the present invention contemplate a telecommunication system 200 having two or more radio base stations, and each radio base station may transmit to one or more cells.

According to this embodiment of the present invention, the transmission by a radio base station of periodic physical signals to each of its cells is synchronized. That is, radio base station 202 transmits periodic physical signals to each of its three cells at the same time. To avoid interference occurring between these transmissions, the signals to each cell may be transmitted on a different frequency or set of frequencies, or using a different scrambling code. Likewise, the radio base station 204 transmits periodic physical signals to each of its three cells at the same time, and the radio base station 206 transmits periodic physical signals to each of its three cells at the same time.

However, the transmissions of each radio base station 202, 204, 206 are offset in time with respect to each other. Thus, although they are transmitted with substantially the same time base (i.e. with the same period), the transmission of the periodic physical signals of each radio base station does not occur at the same time. For example, the radio base station 202 transmits periodic physical signals to each of its cells at time $t_o$, the radio base station 204 transmits periodic physical signals to each of its cells at time $t_1$, and the radio base station 206 transmits periodic physical signals to each of its cells at time $t_2$.

Moreover, according to embodiments of the present invention, transmission by one radio base station of other signals, i.e. control and data signals, is inhibited while other radio base stations are transmitting periodic physical signals. Thus, when radio base station 202 transmits periodic physical signals to each of its cells at time $t_0$, radio base stations 204, 206 are inhibited from transmitting; likewise, when radio base station 204 transmits periodic physical signals to each of its cells at time $t_1$, radio base stations 202, 206 are inhibited from transmitting; and when radio base station 206 transmits periodic physical signals to each of its cells at time $t_2$, radio base stations 202, 204 are inhibited from transmitting.

Figure 7:
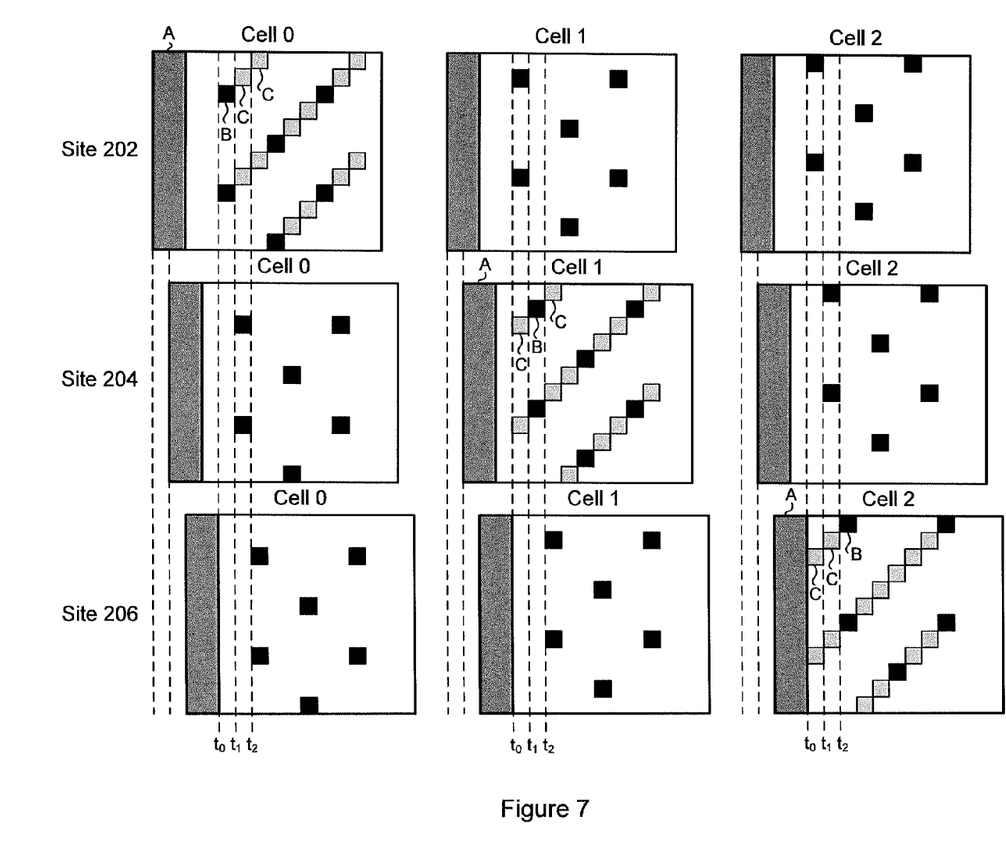
FIG. 7 illustrates a signalling arrangement for the system of FIG. 6.

FIG. 7 illustrates an exemplary signalling arrangement for the radio base stations 202, 204, 206 where time, t, is represented by the horizontal axis, and frequency, f, is represented by the vertical axis. Each highlighted block represents one resource element on which the radio base stations may transmit, and one subframe is shown for each of the three cells served by each radio base station 202, 204, 206. It is to be further noted that the time axis restarts for each column; so, for example, radio base station 202 transmits to each of its cells at the same time, even though they are displaced along the horizontal axis. For clarity, detailed signalling arrangements are only shown for cell 0 of radio base station 202, cell 1 of radio base station 204, and cell 2 of radio base station 206, hereinafter termed the "central" cells in FIG. 6.

Again, the first two OFDM symbols of each subframe are reserved for control signalling A (medium grey). For each radio base station 202, 204, 206, after a further two OFDM symbols periodic physical signals B are transmitted (black squares). This occurs at the same time for each cell served by a particular radio base station, but there is a timing offset between the transmission of periodic physical signals by different radio base stations. In the illustrated example, periodic physical signals are transmitted to each cell of a particular radio base station using a different set of frequencies (i.e. offset vertically).

As can be seen from FIG. 6, the three central cells are in danger of interfering with one another, even taking into account the timing offset between them. Therefore, according to embodiments of the present invention, the radio base stations are prevented from transmitting on resource elements when periodic physical signals are transmitted on potentially interfering cells. The detailed signalling arrangement of cell 0 of radio base station 202 therefore includes a number of limited transmission slots C (light grey), on which transmission is inhibited, or prevented altogether. These are the resource elements that correspond to those used by cell 1 of radio base station 204, and cell 2 of radio base station 206 to transmit periodic physical signals. Similar limited transmission slots are defined for these other cells as well to avoid transmission when radio base station 202 is transmitting periodic physical signals to its cell 0. As there is a frequency offset between cells of each radio base station, in this embodiment the limited transmission slots are also necessarily offset in frequency.

Therefore this are again defined sets of consecutive resource elements (i.e. resource elements that are consecutive in the time domain) in which transmission of periodic physical signals occurs, and in which other transmissions are inhibited. In the first set, for cell 0 of radio base station 202, periodic physical signals are transmitted in the first resource element of the set; in the second set, for cell 1 of radio base station 204, periodic physical signals are transmitted in the second resource element of the set; and in the third set, for cell 2 of radio base station 206, periodic physical signals are transmitted in the third resource element of the set. Each set of resource elements occurs at substantially the same time across each of the cells, because cells either transmit periodic physical signals or are inhibited from doing so during the time covered by the sets of consecutive resource elements. This allows terminals to detect the periodic physical signals from each respective cell more easily.

As with earlier embodiments, in the illustrated embodiment inhibition of other transmissions occurs only in a defined subset of the resource elements in the subframe. However, in some embodiments inhibition of other transmissions occurs in all of the resource elements in the subframe. It will be apparent to those skilled in the art that not all subframes will have periodic physical signals transmitted within them.

In this way, a terminal positioned in one of the central cells of FIG. 6 may more easily detect signals from each of the central cells. For example, this may be used as part of a positioning attempt, as described with respect to FIG. 2.

Such limited transmission resource elements may also be defined for the other cells of each radio base station; however, for clarity only those for three cells are shown.

Figure 8:
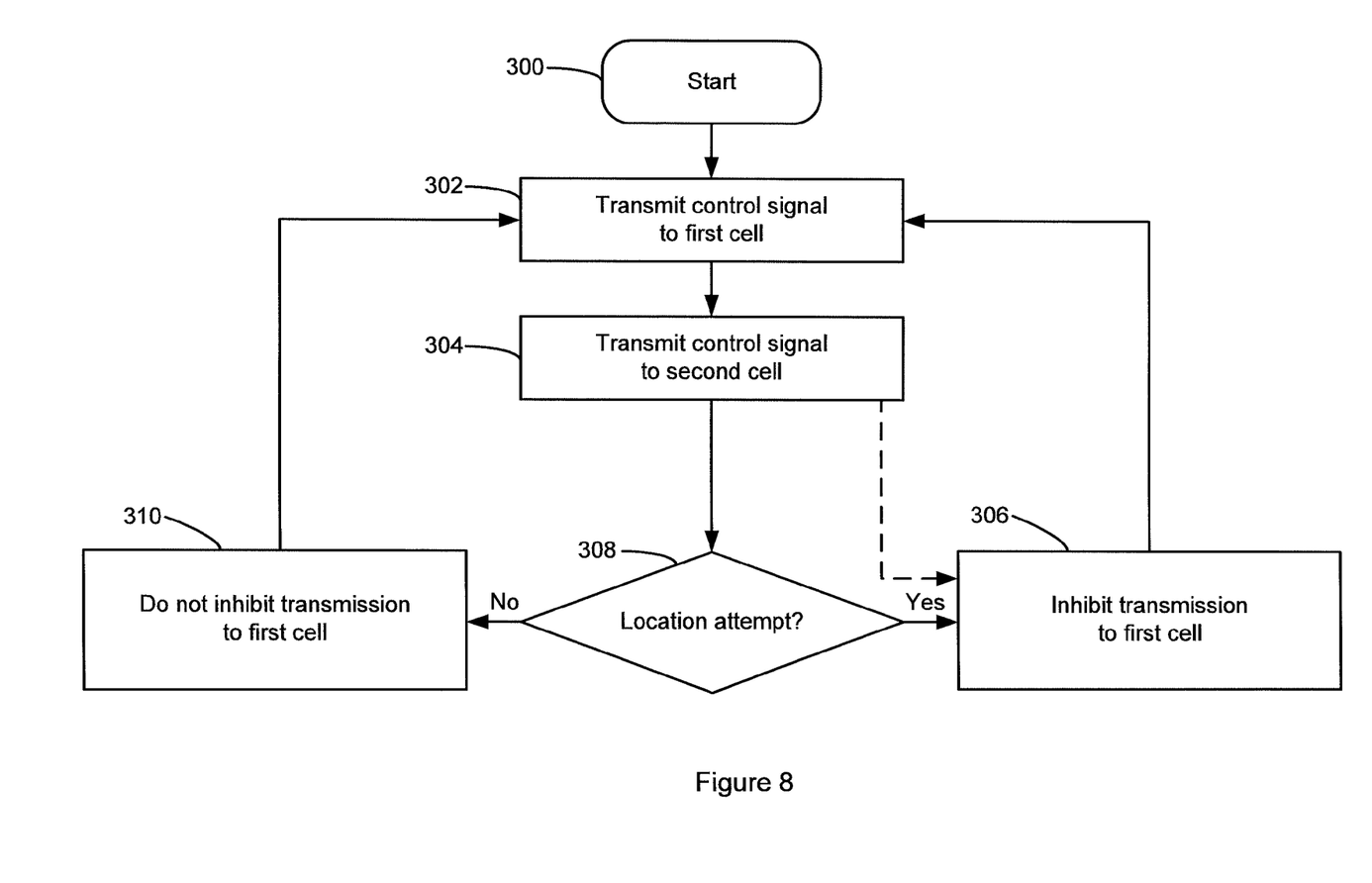
FIG. 8 is a flowchart of a method according to embodiments of the present invention.

FIG. 8 is a flowchart of a method according to embodiments of the present invention. The method may be performed in a telecommunication system as a whole (i.e. employing more than one radio base station), or in an individual radio base station.

The method begins in step 300.

In step 302, periodic physical signals are transmitted to a first cell of the telecommunication system. The periodic physical signals may comprise one or more of reference signals, synchronization signals and dedicated positioning reference signals.

In step 304, at a later time (i.e. with a predetermined timing offset), periodic physical signals are transmitted to a second cell of the telecommunication system.

In an embodiment where the method is performed by a single radio base station, for example the radio base station 30 described with respect to FIG. 3, the radio base station serves both the first and second cells. That is, the radio base station 30 generates periodic physical signals using the processing circuitry 36, and transmits them to the cells using the respective antennas 32.

In an embodiment where the method is performed in two or more radio base stations, the periodic physical signals are transmitted to the first cell by a first radio base station, and to the second cell by a second radio base station.

In one alternative embodiment of the present invention (illustrated by the dashed line in FIG. 8), the method proceeds next to step 306, where transmissions to the first cell are inhibited at the time that periodic physical signals are transmitted to the second cell. The inhibition may be achieved as described with respect to FIGS. 5 and 7, by defining resource elements or OFDM symbols in which transmission is limited, or prevented altogether. After this, the method returns to step 302, and periodic physical signals are transmitted to the first cell again. Of course, it will be clear that the periodic physical signals will in general not be the immediate next transmission; it is likely that control and/or data will be transmitted before the periodic physical signals are next transmitted.

Alternatively, the method may proceed to step 308, where it is determined if an attempt is being made to locate a terminal in the vicinity of the first or second cell. The indication of an attempt to locate a terminal may be received from the terminal itself, or from a core network of the telecommunication system (for example, if the terminal is making an emergency call).

If a location attempt is begin made, the method proceeds to step 306, where transmissions to the first cell are inhibited at the time that periodic physical signals are transmitted to the second cell. The inhibition may be achieved as described with respect to FIGS. 5 and 7, by defining resource elements or OFDM symbols in which transmission is limited, or prevented altogether. After this, the method returns to step 302, and periodic physical signals are transmitted to the first cell again. Of course, it will be clear that the periodic physical signals will in general not be the immediate next transmission; it is likely that control and/or data will be transmitted before the periodic physical signals are next transmitted.

If a location attempt is not being made in this embodiment, no inhibition of transmission on the first cell occurs. That is, the radio base station is free to transmit to the first cell when periodic physical signals are transmitted to the second cell. In this embodiment, therefore, inhibition of transmission occurs only if an attempt is being made to locate a terminal in the first or second cells.

As described above, in embodiments of the present invention, the periodic physical signals may comprise one or more of reference signals, synchronization signals and dedicated positioning reference signals.

Figure 9:
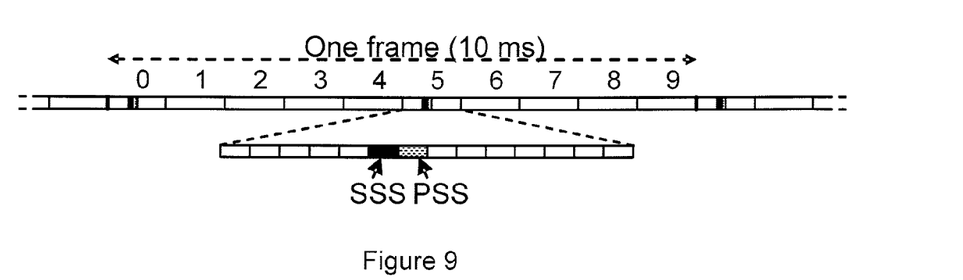
FIG. 9 shows synchronization signals according to embodiments of the present invention.

In Release 8 of the 3GPP specifications, synchronization signals are transmitted in subframes 0 and 5 as illustrated in FIG. 9. The primary synchronization signal (PSS) is transmitted in the last OFDM symbol and the secondary synchronization signal (SSS) in the penultimate OFDM symbol of a subframe. There are three different PSS sequences and 168 different SSS sequences. The sequence identities are used to distinguish different cells. The identity of the cell then can be used to determine the reference signal sequence and its allocation in the time-frequency grid. The synchronization signals occupy 62 resource elements in the centre of the allocated bandwidth.

Also in Release 8 of the 3GPP specifications, reference symbols are transmitted on certain resource elements in every subframe and over the entire bandwidth. They are therefore very suitable for use in channel estimation, especially when the timing measurements are to be performed on other signals, e.g. dedicated positioning reference signals that may be provided in later releases. The dedicated positioning reference signals could themselves be used for channel estimation.

The present invention therefore provides a convenient method for ensuring that a device can detect signals from cells that are not necessarily its serving cell. This has particular utility, for example, in processes to determine the position of the device, where signals from a plurality of radio base stations are required.

The invention has been described mainly with reference to Release 8 and later releases of the 3GPP specifications, and OFDM (orthogonal frequency-division multiplexing) technology; however, it will be understood by those skilled in the art that the invention is also applicable to any wireless cellular telecommunications system, and any transmission technology.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a cellular telecommunication network that includes at least a first cell and a second cell, the method comprising:
    transmitting, to the first cell, first periodic physical signals for use by a device to determine the device's location; and
    transmitting, to the second cell, second periodic physical signals for use by the device to determine the device's location, the second periodic physical signals being synchronized with the first periodic physical signals and having a timing offset such that the first periodic physical signals and the second periodic physical signals are not transmitted simultaneously;
    wherein transmission of data or control signals to the first cell is inhibited when the second periodic physical signals are transmitted to the second cell.

2. The method of claim 1, wherein transmission of the first periodic physical signals occurs within a first set of resource elements, and transmission of the second periodic physical signals occurs within a second set of resource elements, the first and second sets being substantially simultaneous.

3. The method of claim 2, wherein the transmission of data or control signals is inhibited for resource elements of the first and second sets in which the first and second periodic physical signals are not transmitted.

4. The method of claim 1, wherein the first and second periodic physical signals are transmitted by a single radio base station.

5. The method of claim 1, wherein the first periodic physical signals are transmitted by a first radio base station and the second periodic physical signals are transmitted by a second radio base station.

6. The method of claim 1, further comprising receiving an indication that an attempt is being made to locate the device in an area including the first cell and the second cell, wherein the transmission of data or control signals is inhibited in response to the indication.

7. The method of claim 6, wherein the indication is received from the device.

8. The method of claim 6, wherein the indication is received from a core network of the cellular telecommunication network.

9. The method of claim 1, wherein the first and second periodic physical signals include at least one of reference signals, synchronization signals, and dedicated positioning reference signals.

10. A cellular telecommunication system, comprising:
    a first radio base station configured for transmitting first periodic physical signals to a first cell, the first periodic physical signals for use by a device to determine the device's location; and
    a second radio base station configured for transmitting second periodic physical signals to a second cell, the second first periodic physical signals for use by the device to determine the device's location, and the second periodic physical signals being synchronized with the first periodic physical signals and having a timing offset such that the first periodic physical signals and the second periodic physical signals are not transmitted simultaneously;
    wherein transmission of data or control signals by the first radio base station to the first cell is inhibited when the second periodic physical signals are transmitted to the second cell.

11. The telecommunication system of claim 10, wherein transmission of the first periodic physical signals occurs within a first set of resource elements, and transmission of the second periodic physical signals occurs within a second set of resource elements, the first and second sets being substantially simultaneous.

12. The telecommunication system of claim 11, wherein the transmission of data or control signals is inhibited for resource elements of the first and second sets in which the first and second periodic physical signals are not transmitted.

13. The telecommunication system of claim 10, wherein the first and second periodic physical signals include at least one of reference signals, synchronization signals, and dedicated positioning reference signals.

14. A radio base station for a cellular telecommunication network, the radio base station serving at least a first cell and a second cell, the radio base station comprising at least one antenna and being configured to transmit, to the first cell, first periodic physical signals for use by a device to determine the device's location and to transmit, to the second cell, second periodic physical signals for use by the device to determine the device's location, the second periodic physical signals being synchronized with the first periodic physical signals and having a timing offset such that the first periodic physical signals and the second periodic physical signals are not transmitted simultaneously, wherein transmission of data or control signals by the at least one antenna to the first cell is inhibited when the second periodic physical signals are transmitted to the second cell.

15. The radio base station of claim 14, wherein transmission of the first periodic physical signals occurs within a first set of resource elements, and transmission of the second periodic physical signals occurs within a second set of resource elements, the first and second sets being substantially simultaneous.

16. The radio base station of claim 15, wherein the transmission of data or control signals is inhibited for resource elements of the first and second sets in which the first and second periodic physical signals are not transmitted.

17. The radio base station of claim 14, wherein the first and second periodic physical signals include at least one of reference signals, synchronization signals, and dedicated positioning reference signals.

* * * * *

UNITED STATES PATENT AND TRADEMARK OFFICE
CERTIFICATE OF CORRECTION

PATENT NO. : 8,938,254 B2
APPLICATION NO. : 13/131378
DATED : January 20, 2015
INVENTOR(S) : Kangas et al.

Page 1 of 1

It is certified that error appears in the above-identified patent and that said Letters Patent is hereby corrected as shown below:

On the Title Page, in Item (75), under "Inventors", in Column 1, Line 1, delete "Lindingö" and insert -- Lidingö --, therefor.

IN THE SPECIFICATION

In Column 8, Line 20, delete "$t_o$," and insert -- $t_0$, --, therefor.

Signed and Sealed this
Sixth Day of October, 2015

Michelle K. Lee
*Director of the United States Patent and Trademark Office*